United States Patent [19]

McGee

[11] 4,289,230
[45] Sep. 15, 1981

[54] TROUGHED BELT CONVEYORS

[76] Inventor: Terence McGee, 7 Weaver St., Kirkstall Rd., Leeds 4, Yorkshire, England

[21] Appl. No.: 870,796

[22] Filed: Jan. 19, 1978

[51] Int. Cl.² .................. B65G 15/60; B65G 15/08
[52] U.S. Cl. ............................. 198/811; 198/825
[58] Field of Search ............ 198/811, 823, 824, 825, 198/841, 842

[56] References Cited

U.S. PATENT DOCUMENTS 254,158  2/1882  Roat ................................. 198/824
714,812 12/1902  Mann et al. ...................... 198/824
2,358,609  9/1944  Uhlig ............................... 198/841

FOREIGN PATENT DOCUMENTS 1380573  1/1975  United Kingdom ............. 198/823

Primary Examiner—Jeffrey V. Nase
Attorney, Agent, or Firm—Fred Philpitt

[57] ABSTRACT

This invention relates to a troughed belt conveyor intended primarily for conveying bulk material, for example coal, aggregate and animal feeding stuffs etc. The troughed belt conveyor is supported at its infeed and outfeed ends by waisted rollers and is supported between its ends by horizontal and inclined rollers which maintain the belt in its troughed shape.

7 Claims, 10 Drawing Figures

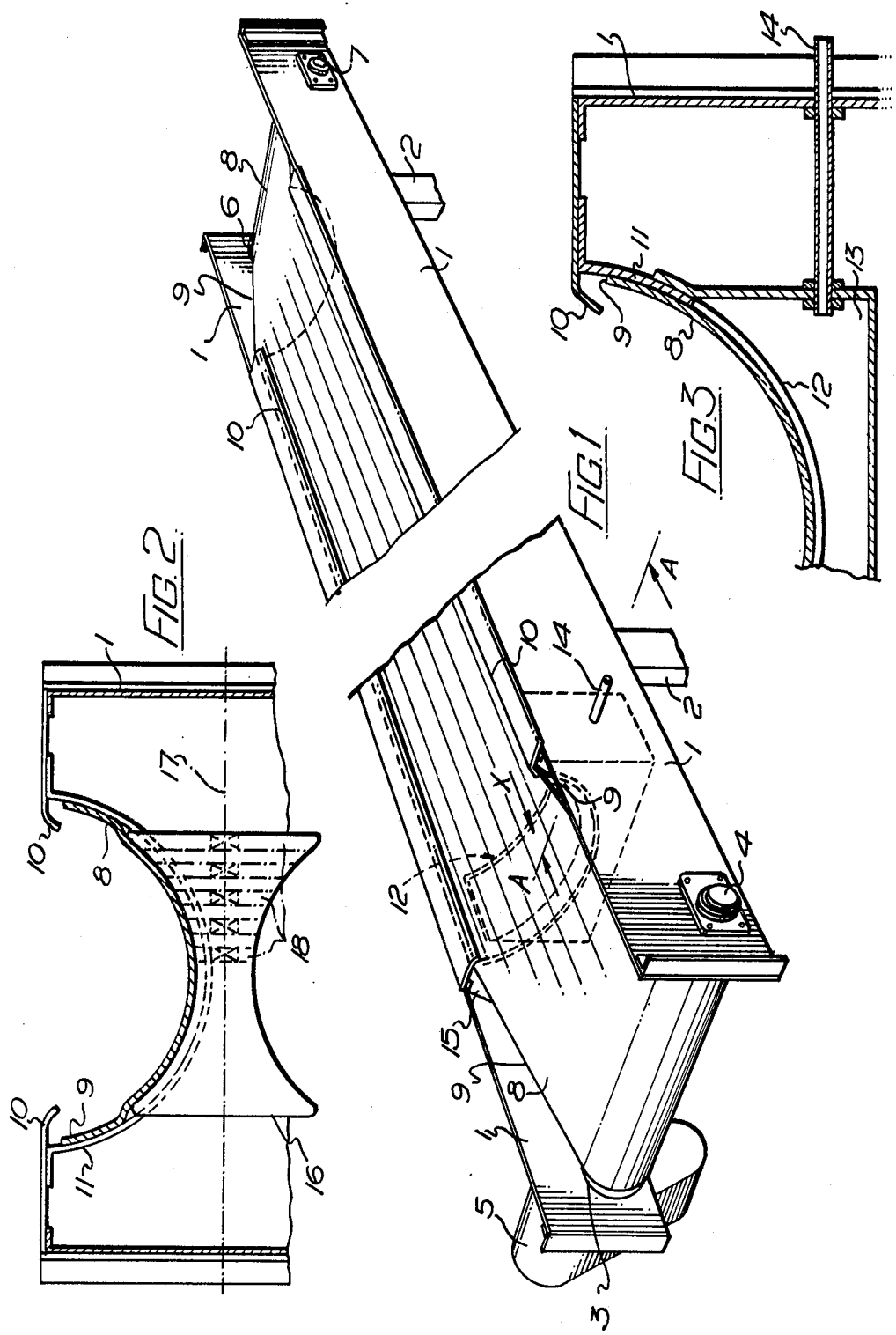

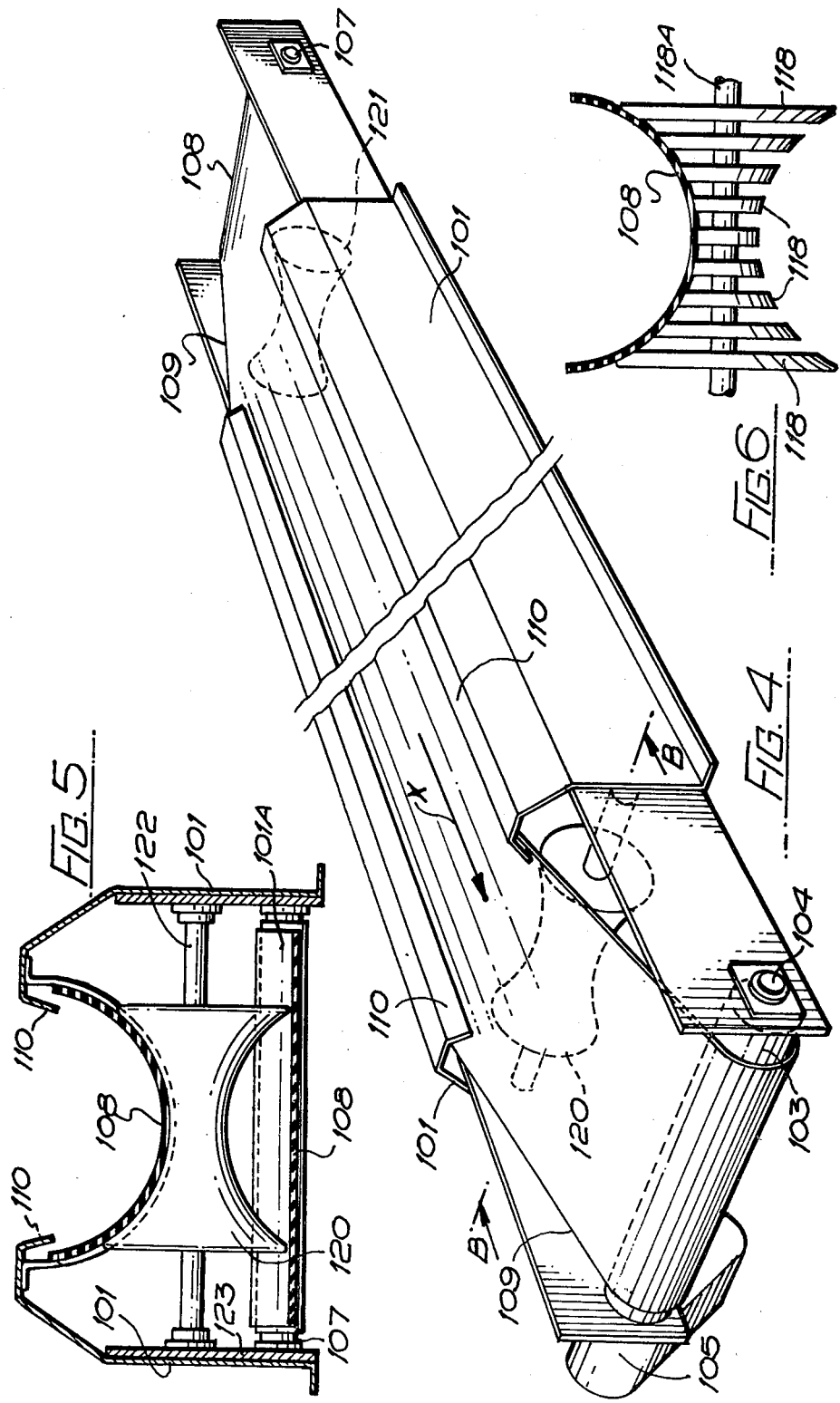

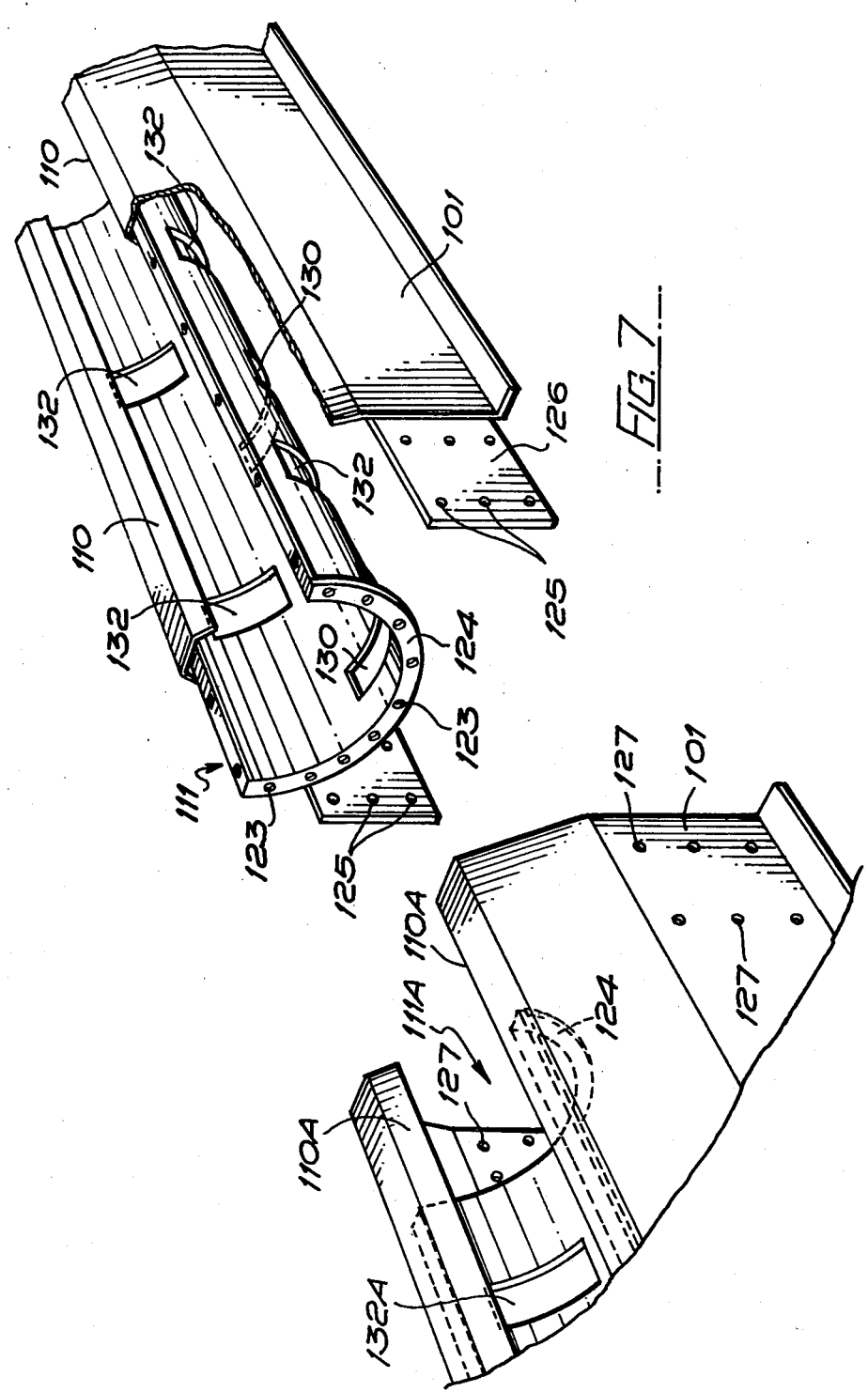

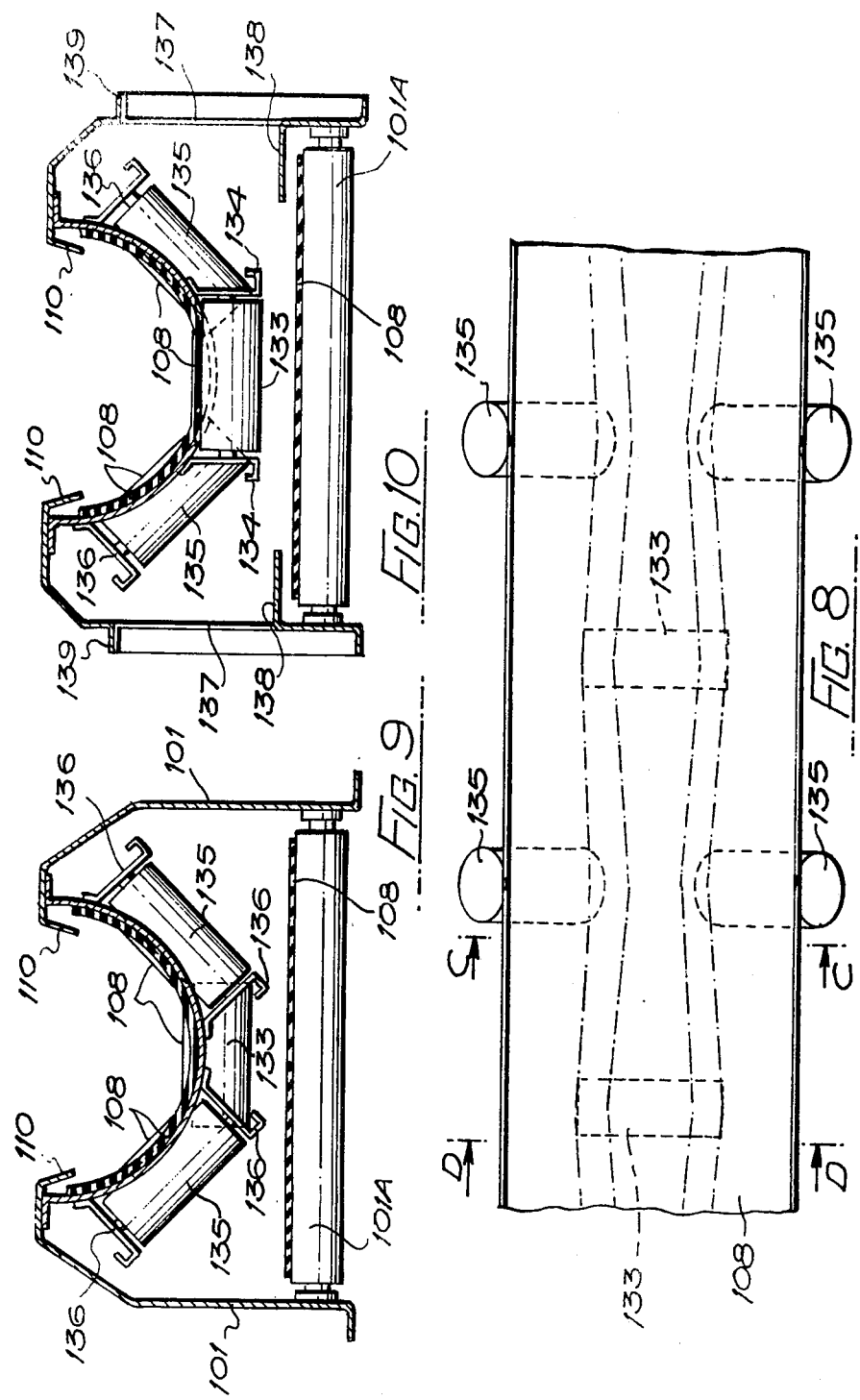

4,289,230

TROUGHED BELT CONVEYORS

THE PRESENT INVENTION

According to the present invention, there is provided a troughed belt conveyor comprising an endless belt supported in its load carrying stretch upon a skid base which is curved in cross-section to cause the belt to assume an upwardly concave cross-sectional shape, the belt being arranged to travel along and in sliding contact with said base, and at least adjacent the infeed and outfeed ends of the said base are located waisted rollers having their concave surfaces projecting sufficiently above said skid base to support the belt at those locations slightly clear of said skid base.

The skid base may be provided with a series of centrally located gaps along its length, said gaps extending laterally short of the longitudinal edges of the belt and communicating with at least one manifold through which fluid under pressure is supplied to said gaps so that said belt may be supported clear of the skid base at the locations of said gaps so as to reduce frictional drag of said belt on said skid base.

Alternatively, the skid base may be provided along its length with a first series of cut-outs through which project rollers, and a second series of cut-outs through which project inclined rollers, said second series of cut-outs and their inclined rollers alternating along the skid base with the first series of cut-outs and their laterally spaced apart rollers, said second series of cut-outs comprising pairs of opposed cut-outs located in opposing sides of the skid base, said rollers and said inclined rollers supporting the belt clear of the skid base at selected points and being carried by means secured to said skid base.

Said laterally located rollers and said inclined rollers will preferably be freely rotatable in said means secured to said skid base.

In order that the invention may be more readily understood, exemplary embodiments thereof will now be described with reference to the accompanying drawings, wherein:

FIG. 1 is a perspective view broken in the centre to indicate that the total length of the conveyor is variable to adapt to the purpose for which it is intended;

FIG. 2 is a mid-sectional view of the upper portion of the conveyor of FIG. 1;

FIG. 3 is a vertical cross-section taken on the line A—A in FIG. 1 through the upper part of the conveyor;

FIG. 4 is a view similar to FIG. 1, but showing an alternative embodiment of the invention;

FIG. 5 is a sectional end elevation taken along line B—B in FIG. 4.

FIG. 6 is a view of part of FIG. 5 and showing an alternative construction of the waisted roller of FIG. 5.

FIG. 7 is a perspective view, partly broken away, of a skid base forming part of the conveyor of FIG. 4, the belt having been removed for the purposes of clarity;

FIG. 8 is a plan view of part of the conveyor shown in FIG. 4;

FIG. 9 is a sectional end elevation of the conveyor taken along the line C—C in FIG. 7, the waisted roller having been removed for clarity; and FIG. 10 is a sectional end elevation similar to FIG. 8, but the section being taken on the line D—D in FIG. 7.

Referring to the drawings, and firstly to FIGS. 1 to 3, the conveyor is shown as having side frame members 1 supported on base members 2. A cylindrical head roller 3 on a head shaft 4 is driven through mechanism in drive box 5, and a tail roller 6 is mounted on a tail shaft 7. An endless conveyor belt 8 passes around these rollers in the direction indicated by arrow X (FIG. 1) and the return stretch of the belt is supported and tensioned if desired in any conventional manner. The longitudinal edges 9 of the belt run beneath continuous overhanging guide surfaces or skirts 10 except at each end where the belt changes its contour.

The skid base 11 as shown in FIGS. 2 and 3 is approximately semi-circular in cross-section and the belt which is constructed in the conventional flat form conforms to the surface of the skid base. However, the skid base surface may be of other contour than semi-circular provided that it is upwardly concave so as to cause the belt to assume a trough form while travelling over it. Both ends of the skid base are provided with a bead hip or other means to facilitate a smooth passage for the belt onto and off the base. As indicated in FIG. 3, the skid base 11 has provided in its lower part in its lower part arcuate gaps or cut-outs 12 located at intervals along its length and extending laterally short of the longitudinal edges of the belt and below each one is fixed a manifold box 13 with an inlet pipe 14, to all of which pipes compressed air can be supplied to provide an under pressure beneath the belt particularly at the cut-outs but also to some extent along the whole length of the base, thus further reducing frictional drag. When the belt is carrying materials the weight thereof presses the side portions of the belt against the upper parts of the base above the cut-outs and thereby helps to form a seal to contain the pressurised air beneath the belt.

FIG. 2 indicates the location of one of the waisted rollers 16 which is mounted on its horizontal axis 17 in mountings (not shown) in the side frame members 1 with its upper concave surfaces projecting very slightly up through a gap in the skid base but only sufficiently to support the belt at that point just clear of the skid base surface. Such clearance is exaggerated in FIG. 2 for clarity of illustration. The gaps in which these rollers are located may conveniently be the same as or similar to the gaps 12 for the under pressure manifold boxes 13, and they may be spaced at such intervals along the base as is desirable or required to suit the kind of materials to be conveyed. The axis 17 on the mountings therefor will be adjustable through a small vertical distance and the rollers will be fully trackable to control their effect on the straight running of the belt, but care must be taken not to lift the belt sufficiently to break the sliding seal between the belt side edges and the trough support. The rollers may be free running or they may be driven.

If desired, the edges 9 of the belt may be led past smooth guides 15 (FIG. 1) of hardened metal or other suitable material as the belt changes contour.

It will be appreciated that there is no necessity to use head and tail rollers with axially concave surfaces because the belt can change its contour without detriment, and indeed in many cases it is desirable that the belt should be flat at its discharge end and to facilitate scraping off the belt any sticky or moist materials being discharged.

Quite a long conveyor, say 300 meters or more, may be used embodying the invention and it can be used advantageously as a shuttle conveyor in which case it would be mounted for bodily movement longitudinally to discharge materials into any selected one of a series of receptacles, its simple structure facilitating the control of its shuttle movements. The conveyor can also be used in inclined positions to elevate materials, and in this respect shows an advantage in the practicable steepness of inclination compared with conventional roller based troughed belt conveyors.

A further advantage achieved by the invention is that when used for handling quite hot materials, the close contact of the belt with the metal skid base can act to keep the belt sufficiently cool by conduction of heat through the skid base.

As an alternative to waisted rollers, the belt may also be relieved from the skid base 11 by the use of a series of discs, graduated in size to correspond to the shape of the trough and mounted upon a common spindle, each disc being free to rotate on the spindle independently of the other discs, the discs forming in effect the equivalent of a waisted roller, even though the discs are spaced from each other. Some discs 18 of such a series are indicated in dot and dash line in FIG. 2.

Referring now to FIG. 4, the conveyor shown is similar to that shown in FIG. 1, so that like parts have been given the same reference numeral in the series "100". Thus, the conveyor comprises side frame members 101 which extend downwardly to and are supported on a support surface such as a floor, not shown. A cylindrical head roller 103 on a head shaft 104 is driven through mechanism in a drive box 105, and a similar tail roller (not shown) is mounted on a tail shaft 107. The endless conveyor belt 108 passes around said head and tail rollers in the direction of arrow X and the return stretch of the belt is supported and tensioned if desired in any conventional manner such as on rollers, some of which are indicated by reference numeral 101A in FIGS. 5, 9 and 10. The longitudinal edges 109 of the belt 108 run beneath continuous overhanging guide surfaces or skirts 110 except at each end where the belt changes its contour. Located at the infeed end of the conveyor and at the outfeed end of the conveyor are waisted rollers 120 and 121 which are each mounted on a shaft 122 supported in structure 123 carried by the side frames 101. The waisted rollers 120 and 121 may be free-running or they may be driven by means not shown in the drawings, but connecting with the shafts 122.

As an alternative to the waisted rollers 120 and 121, a series of discs 118 (FIG. 6) may be provided, the discs being graduated in size to correspond to the shape of the rollers 120 and 121 and each series being mounted upon a common spindle 118A, each disc being free to rotate on the respective spindle independently of the other discs.

The conveyor according to the invention includes a skid base 111 shown in some detail in FIG. 7. In fact, in most instances and to achieve the desired length of the conveyor, the conveyor will include a plurality of skid bases—part of a second skid base is indicated by reference numeral 111A—which are joined in end-to-end relationship by means of bolts or the like (not shown) passing through holes 123 in flanges 124 at the ends of the skid bases. Similarly the side frames 101 will be connected together by passing bolts or the like (not shown) through holes 125 in a fillet plate 126 and through holes 127 in the side frame members 101. Thus, a conveyor of any desired length may be formulated using the required number of modular skid bases.

As will be clearly seen from FIG. 7, each skid base, referring now specifically to skid base 111, has a first series of cut-outs 130 which are spaced at desired intervals along the length of the skid base, said cut-outs 130 being located centrally of the skid base and extending laterally thereof and terminating short of the edges of the skid base. A second series of cut-outs 132 is also provided, the cut-outs of this second series being arranged in pairs in opposed sides of the skid base and being located alternately to the cut-outs 130 in the longitudinal direction of the skid base.

The cut-outs 130 are each adapted to have projecting therethrough a horizontally located roller 133 which is carried in support brackets 134 secured to the underside of the skid base, the rollers 133 being free-running and being so located with respect to the skid base that the upper peripheries of the rollers project slightly above the skid base surface through their respective cut-outs 130. This is shown in a somewhat exaggerated way (for the purposes of illustration) in FIG. 9. Similarly, the cut-outs 132 are each adapted to have projecting therethrough a roller 135 which are each carried in brackets 136 secured to the underside of the skid base. The rollers 135, like the rollers 133 will be free-running and are so located with respect to the skid base that their upper peripheries project slightly above the skid base surface through their respective cut-outs 132, this being shown in exaggerated form for the purposes of illustration only in FIG. 9.

With the provision of the spaced rollers 133 and 135, the belt 108 when conforming substantially to the curvature of the skid base surface is maintained clear of the skid base surface at the positions of the rollers which will thus avoid friction forces between the belt and the skid base surface. During travel of the upper stretch of the belt 108 over the skid base, the cross-sectional contour of the belt will be continually but gently changing between the positions of adjacent rollers, these varying contours being illustrated in dash lines in FIG. 8.

It will be seen from FIG. 9 that the rollers 133 and 135 are totally enclosed by the belt 108, the skid base 111 and the side frames 101 so the structure is dust free, but a series of inspection apertures 137 may be provided in the side frames 101 as shown in FIG. 10 such apertures being formed by folding portions 138 and 139 out of the median plane of the side frames 101.

It will be appreciated that the rollers 133 and/or the rollers 135 could be waisted if desired, or they may consist of a series of discs somewhat as shown in FIG. 6.

From the drawings, it will be seen in a conveyor according to the invention that the belt 108 changes from a flat position at the infeed end of the conveyor to a curved position—due to the provision of the waisted roller 120 or the discs 118 and then again assumes a flat position at the outfeed end of the conveyor where it gradually changes from the curved position to the flat position due to the diabolo shaped roller 121. The provision of the fluid manifolds and the waisted rollers (or discs) along the length of the conveyor, or the provision of the alternating rollers 133 and 135 maintain the belt clear of the skid base surface so as to avoid adhesion of the belt to the surface.

A conveyor according to the invention is easy to maintain and simple yet effective in operation, and because of the construction of the skid base conveyor of any desired length may be constructed.

I claim:

1. A troughed belt conveyor comprising an endless travelling belt supported in its load carrying stretch upon a skid base which is curved in cross-section to cause the belt to assume an upwardly concave cross-sectional shape, the belt being arranged to travel along and in sliding contact with said base, waisted rollers located at least adjacent the infeed and outfeed ends of the said base, said waisted rollers having their concave surfaces projecting sufficiently above the skid base to support the belt at those locations slightly clear of said skid base, said skid base being provided along its length with a first series of spaced apart cut-outs through which project horizontally disposed rollers, and a second series of cut-outs through which project inclined rollers, said second series of cut-outs and their inclined rollers alternating with said first series of cut-outs along the length of the skid base and said second series comprising pairs of opposed cut-outs located on opposite sides of the skid base, said horizontally disposed rollers and said inclined rollers supporting the endless belt clear of the skid base at selected points and being carried by means secured to said skid base.

2. A troughed belt conveyor according to claim 1 wherein said horizontally disposed rollers and said inclined rollers are freely rotatable in said means secured to said skid base.

3. A troughed belt conveyor according to claim 1 wherein the skid base is supported on side frame members which are provided with a series of inspection apertures along their lengths, said inspection apertures being located at the positions of said cut-outs.

4. A troughed belt conveyor according to claim 1 wherein each of said waisted rollers is composed of a plurality of discs whose outer surfaces are shaped such that when the discs are placed together on a common spindle, the composite outer surface is waisted.

5. A troughed belt conveyor according to claim 1 wherein the longitudinal edges of the belt run along the skid base beneath overhanging guide surfaces which locate the belt laterally.

6. A troughed belt conveyor according to claim 1 including head and tail rollers located remote from the ends of said skid base, said head and tail rollers being of cylindrical form.

7. A troughed belt conveyor according to claim 1 wherein said skid base is provided with a series of centrally located gaps along its length, said gaps extending laterally short of the longitudinal edges of the belt and communicating with at least one manifold through which fluid under pressure is supplied to said gaps so that said belt may be supported clear of the skid base at the locations of said gaps so as to reduce frictional drag of said belt on said skid base.

* * * * *